United States Patent
Dhingra

(10) Patent No.: US 12,223,401 B2
(45) Date of Patent: Feb. 11, 2025

(54) INTEGRATING MACHINE-LEARNING MODELS IMPACTING DIFFERENT FACTOR GROUPS FOR DYNAMIC RECOMMENDATIONS TO OPTIMIZE A PARAMETER

(71) Applicant: SAMYA.AI INC., Northbrook, IL (US)

(72) Inventor: Deepinder Dhingra, Bangalore (IN)

(73) Assignee: SAMYA.AI INC., Northbrook, IL (US)

( * ) Notice: Subject to any disclaimer, the term of this patent is extended or adjusted under 35 U.S.C. 154(b) by 99 days.

(21) Appl. No.: 17/264,838

(22) PCT Filed: Jan. 20, 2021

(86) PCT No.: PCT/IN2021/050053
§ 371 (c)(1),
(2) Date: Jan. 31, 2021

(87) PCT Pub. No.: WO2021/149075
PCT Pub. Date: Jul. 29, 2021

(65) Prior Publication Data
US 2023/0162082 A1 May 25, 2023

(30) Foreign Application Priority Data
Jan. 21, 2020 (IN) .............................. 202041002561

(51) Int. Cl.
*G06N 20/00* (2019.01)
*G06N 7/01* (2023.01)

(52) U.S. Cl.
CPC .............. *G06N 20/00* (2019.01); *G06N 7/01* (2023.01)

(58) Field of Classification Search
None
See application file for complete search history.

(56) References Cited

U.S. PATENT DOCUMENTS

| 2002/0116348 A1 | 8/2002 | Phillips et al. |
| 2003/0074250 A1 | 4/2003 | Burk |

(Continued)

FOREIGN PATENT DOCUMENTS

| CN | 109741112 A | | 5/2019 |
| JP | 2019053737 A | * | 4/2019 |

OTHER PUBLICATIONS

International Search Report and Written Opinion issued in PCT Application No. PCT/IN2021/050053, dated Apr. 30, 2021, 7 pages.

*Primary Examiner* — Lut Wong
(74) *Attorney, Agent, or Firm* — Wiley Rein LLP

(57) ABSTRACT

A method for integrating a machine learning (ML) model that impacts different factor groups for generating a dynamic recommendation to collectively optimize a parameter is provided. The method includes (i) processing a specification information and operational data associated with a demand management service obtained from client devices (116A-N), (ii) training the ML models with processed specification information and the operational data to obtain a trained ML model that includes an anticipation ML model that optimizes demand parameter or recommendation ML model that generates recommendation for optimizing a factor group, (iii) integrating the trained ML model with the ML models by setting an output of a first ML model as a feature of a second ML model and (iv) determining a demand of a product using the trained ML models and quantifying probabilistic values that signify prediction of the demand.

12 Claims, 8 Drawing Sheets

(56) References Cited

U.S. PATENT DOCUMENTS

| | | | |
|---|---|---|---|
| 2015/0134413 A1* | 5/2015 | Deshpande | G06Q 30/0205 |
| | | | 705/7.31 |
| 2017/0323250 A1* | 11/2017 | Lindbo | G06Q 30/0621 |
| 2018/0012166 A1* | 1/2018 | Devadas | G06Q 10/06315 |
| 2019/0130425 A1* | 5/2019 | Lei | G06Q 30/0201 |
| 2019/0244230 A1 | 8/2019 | Subramanian et al. | |

* cited by examiner

INTEGRATING MACHINE-LEARNING MODELS IMPACTING DIFFERENT FACTOR GROUPS FOR DYNAMIC RECOMMENDATIONS TO OPTIMIZE A PARAMETER

CROSS-REFERENCE TO RELATED APPLICATIONS

This patent application claims priority to PCT patent application no: PCT/2021/050053 filed on Jan. 20, 2020, the complete disclosures of which, in their entirety, are hereby incorporated by reference.

BACKGROUND

Technical Field

The embodiments herein generally relate to automatically maximizing a parameter of a use-case, and more particularly, using machine learning models that impact a different factor group of the use-case integrating them to automatically maximize a parameter of the use-case.

Description of the Related Art

Organizations relating to use-case of consumer goods have complex operations. One or more teams participate in one or more activities that impact a factor group associated with a team. Such teams exist at both a supply side such as a procurement team, a production team, a logistics team, an inventory management team, etc. and at a demand side such as a sales team, a promotion team, a pricing team, etc. Even though these teams belong to the same organization, systems and processes that enable operations of these teams are different and they optimize for different factor groups. For example, in the same organization, the team associated with promotions may optimize for factor groups such as average price of an item or a cost of a promotion activity, whereas the team associated with inventory may optimize for its own factor group which includes factors such as demand consumption, network path, order frequency, etc.

Traditional approaches for sales and distribution, promotion and inventory optimization have been done separately in silos. As the teams optimize for different factor groups and the organization as a whole has complex operations due to a plurality of channels, products, customer segments and geographically distributed network operations that span over a plurality of countries, the effective impact of the teams gets limited and they are not able to able to collectively optimize an individual parameter of the organization. Also the traditional systems for enterprise resource planning are not architected to handle high volume, change and speed scenarios which have complex relationships. These traditional systems are also not architected to learn from the latest patterns and signals from internal and external information sources.

Further, the number increase of factors, combination of units such as products, channels or geographies amount to the sheer scale, complexity and volatility of the operations and the organization is unable to accurately anticipate demand in the future for different products in a holistic manner and are unable to collectively optimize a parameter of the organization. The inefficiencies from this inability to collectively optimize are passed on to the respective department, inventory department becomes unable to accurately carry the right inventory at the right location and is unable to adapt to changing demand, promotions department becomes unable to optimize and quantify the impact of price reductions and promotions and sales & distribution department becomes unable to carry out right sales and distribution activities, such as on which channels, locations and customer segments it should focus on.

This inability of collective optimization leads various negative consequences related to the parameter of the organization such as inventory imbalance, low return of investment from promotion, low effectiveness for pricing and inefficient sales & distribution activities. The overall impact of the negative consequences on the organizations is much severe as it leads to revenue leakage and loss of revenue growth potential.

Accordingly, there remains a need of an integrated system which can automatically anticipate demand for the organization and provide dynamic recommendations to the three departments on the basis of the demand anticipated so that the parameter of the organization can be collectively optimized.

SUMMARY

In view of the foregoing, embodiments herein provide a method for integrating one or more machine-learning models that impact different factor groups for generating a dynamic recommendation to collectively optimize a parameter. The method includes (i) processing, at a demand management server, a specification information of a demand management service and operational data that corresponds to the demand management service obtained from a client device, (ii) training, at the demand management server, a machine learning (ML) model of the one or more ML models using processed specification information and the operational data to obtain a trained ML model, (iii) integrating the trained ML model with the one or more ML models by setting an output of a first ML model as a feature of a second ML model, (iv) determining a demand of a product of the demand management service using integrated ML models by (a) identifying an emerging signal that represents an impact that corresponds to at least one factor that of at least one factor group, (b) determining an elasticity of the at least one factor to the demand of the product and an effect of interaction between one or more factors associated with at least one factor group on the demand, and (c) quantifying probabilistic values that signify prediction of the demand, (v) updating in real-time, a recommendation ML models that generates a recommendation for optimizing at least one factor group using quantified probabilistic values, and (vi) generating the dynamic recommendation to the client device to update values of the at least one factor of the at least one factor group using the recommendation model. The one or more ML models includes an anticipation ML model that optimizes a demand parameter or the recommendation ML model generates the recommendation for optimizing the at least one factor group. The at least one factor group includes at least one of a first factor group, a second factor group or a third factor group. The probabilistic values include at least one elasticity associated with the at least one factor and a demand forecast adjustment of the product. The dynamic recommendation is the recommendation associated with at least one factor group and collectively optimizes the parameter of the demand management service.

In some embodiments, the first factor group includes a pricing and promotions factor group, the second factor group includes a sales and distribution factor group, and the third factor group includes an inventory placement and allocation factor group.

In some embodiments, the specification information includes internal data of the at least one group and a meta-data model that corresponds to the at least one group.

In some embodiments, the operational data corresponds to the pricing and promotions factor group and includes data that corresponds to a promotion, at least one sales activity, at least one distribution activity history and at least one plan, the operational data corresponds to the sales and distribution factor group and the operational data includes the data corresponding to a sale of a product, an order history and a sales plan and the operational data corresponds to the inventory placement and allocation factor group and in the data corresponding to an inventory history and an inventory plan.

In some embodiments, the demand management server identifies the emerging signal represents the impact corresponds to the at least one factor using deep learning and ML algorithms.

In some embodiments, the computing the demand of the at least one product using at least one of the anticipation model to determine (i) dynamic demand forecasting and sensing, (ii) predictive a new product forecasting, (iii) demand driver attribution or (iv) demand risk and opportunity quantification.

In some embodiments, the pricing and promotions factor group includes at least one of a channel, a location of a promotion activity, a product for promotion, a price-pack, a time period or a calendar for a promotion activity, a promotion type, a price for a promotion activity, a discount for a promotion activity, or a creative for a promotion activity.

In some embodiments, the recommendation to update the values of the pricing and promotions factor group is generated using the at least one the recommendation ML model for (i) forecasting of trends and anomalies with respect to a plan of sale of a point of a sale device, (ii) a warning of sales deviation, (iii) determining the at least one factor of the one or more factor group attributed for driving sales of the at least one product using sales driver attribution, or (iv) a prediction of volume share.

In some embodiments, the sales and distribution factor group includes at least one of a location factor, a store factor, a product factor, a price-pack factor, a placement of product factor, a placement factor, a range factor, a visibility factor, a coverage factor, a frequency factor, a distribution reach factor, a channel factor, an event type factor or an incentive factor.

In some embodiments, the recommendation to update the values of the sales and distribution factor group is generated using the at least one of ML model for (i) promotional lift effectiveness and return of investment, (ii) promotion deviation and opportunity detection, or (iii) optimization of promotion.

In some embodiments, the inventory placement and allocation factor group includes at least one of a location of inventory, a store of inventory, a type of inventory, a source location of inventory, a transfer of inventory, a new quantity for the inventory, a safety stock of inventory for a product, on hand levels of inventory or a reorder quantity of inventory, or an allocation quantity of inventory.

In some embodiments, the recommendation to update the values of the inventory placement and allocation factor group is generated using the machine learning model for on hand inventory forecasts, (ii) out of stock or excess stock prediction, (iii) inventory driver attribution and (iv) quantification of inventory deviation.

In some embodiments, the ML model is trained with planning data of the at least one group. In some embodiments, the planning data includes sales plans and forecasts, financial plans and forecasts, price plans, marketing plans, promotion plans, demand plans, inventory plans and production plans.

In some embodiments, the method includes the step of tracking at least one action taken by one or more clients at the one or more client devices for enabling reinforcement learning of the at least one ML models to provide accurate predictions on the demand of the at least one product.

In one aspect, a system for integrating one or more machine-learning models that impact different factor groups for generating a dynamic recommendation to collectively optimize a parameter is provided. The system includes a demand management server that includes a memory that stores a set of instructions and a processor that executes the set of instruction. The processor is configured to (i) process a specification information of a demand management service and operational data that corresponds to the demand management service obtained from a client device, (ii) train a machine learning (ML) model of the one or more ML models using processed specification information and the operational data to obtain a trained ML model, (iii) integrate the trained ML model with the one or more ML models by setting an output of a first ML model as a feature of a second ML model, (iv) determine a demand of a product of the demand management service using integrated ML models by (a) identifying an emerging signal that represents an impact that corresponds to at least one factor that of at least one factor group, (b) determining an elasticity of the at least one factor to the demand of the product and an effect of interaction between one or more factors associated with at least one factor group on the demand, and (c) quantifying probabilistic values that signify prediction of the demand, (v) update in real-time, a recommendation ML models that generates a recommendation for optimizing at least one factor group using quantified probabilistic values, and (vi) generate the dynamic recommendation to the client device to update values of the at least one factor of the at least one factor group using the recommendation model. The one or more ML models includes an anticipation ML model that optimizes a demand parameter or the recommendation ML model generates the recommendation for optimizing the at least one factor group. The at least one factor group includes at least one of a first factor group, a second factor group or a third factor group. The probabilistic values include at least one elasticity associated with the at least one factor and a demand forecast adjustment of the product. The dynamic recommendation is the recommendation associated with at least one factor group and collectively optimizes the parameter of the demand management service.

In some embodiments, the at least one factor group includes a pricing and promotions factor group, a sales and distribution factor group or an inventory placement and allocation factor group.

In some embodiments, the specification information includes internal data of the at least one group and a meta-data model that corresponds to the at least one group.

In some embodiments, the operational data corresponding to the at least one factor group. In some embodiments, the operational data corresponds to the pricing and promotions factor group includes data that corresponds to a promotion, at least one sales activity, at least one distribution activity history and at least one plan. In some embodiments, the operational data corresponds to the sales and distribution factor group includes the data corresponding to a sale of a product, an order history and a sales plan. In some embodiments, the operational data corresponds to the inventory placement and allocation factor group includes the data corresponding to an inventory history and an inventory plan.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
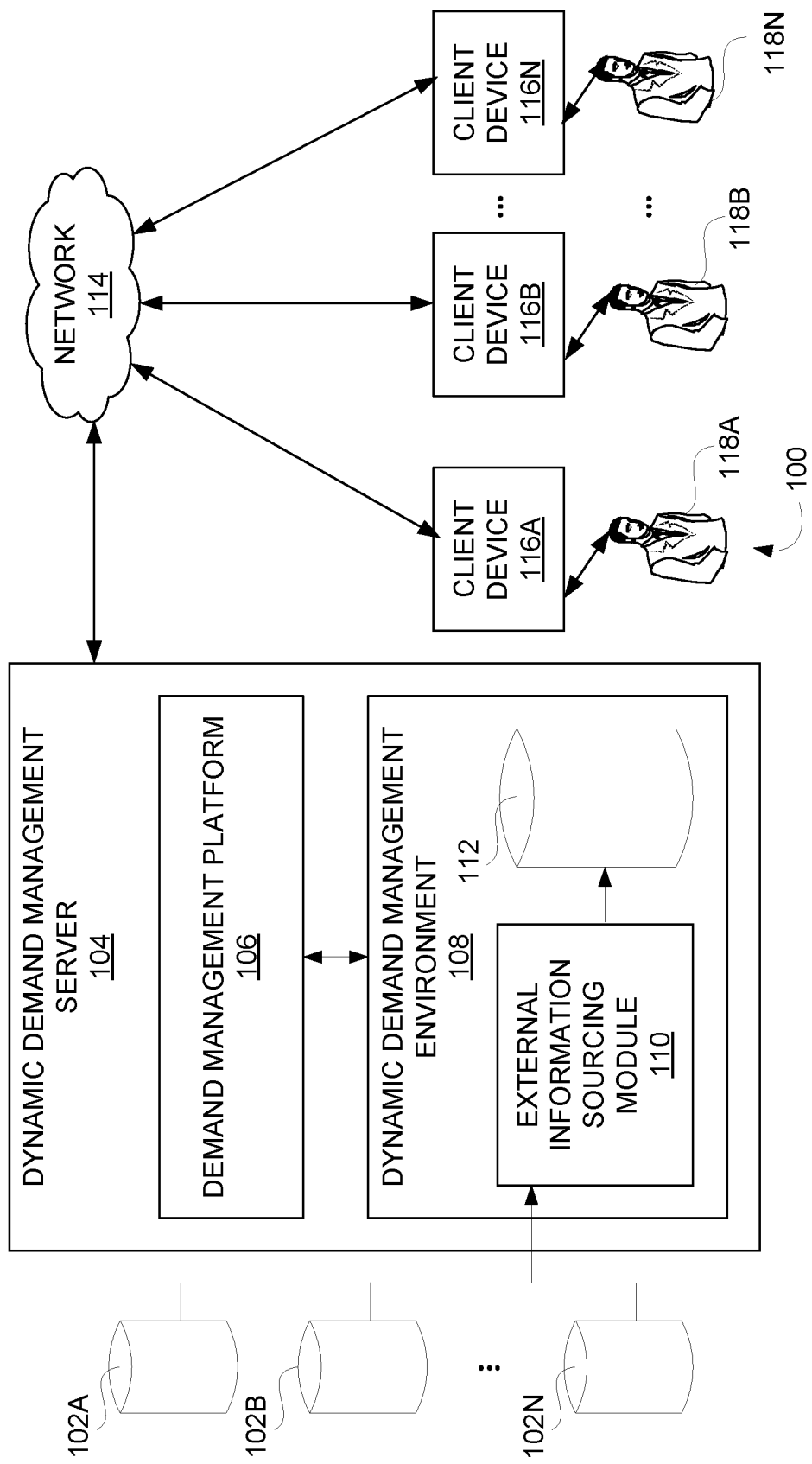
FIG. 1 is a block diagram that illustrates a system of generating a dynamic recommendation to collectively optimize a parameter according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 7, where similar reference characters denote corresponding features in a consistent manner throughout the figures, there are shown preferred embodiments. A "use-case" in this specification is defined as an organization or enterprise that uses a demand management service.

FIG. 1 is a block diagram 100 that illustrates a system of generating a dynamic recommendation to collectively optimize a parameter according to some embodiments herein. The block diagram 100 includes one or more external data sources 102A-N, a dynamic demand management server 104, a network 114 and one or more client devices 116A-N associated with one or more clients 118A-N. The dynamic demand management server 104 includes a demand management platform 106 and a dynamic demand management environment 108 that includes an external information sourcing module 110 and an external information database 112. In some embodiments, the dynamic demand management server 104 includes demand management resources residing within the dynamic demand management environment 108. In some embodiments, the demand management platform 106 manages the demand management resources to provide demand management as a demand management service to the one or more client devices 116A-N through the network 114. In some embodiments, the network 114 is a wired network. In some embodiments, the network 114 is a wireless network. In some embodiments, the network 114 is a combination of a wired network and a wireless network. In some embodiments, the network 114 is the Internet.

In some embodiments, the one or more client devices 116A-N and the demand management service are associated with a group. In some embodiments, the one or more client devices 116A-N, without limitation, may be selected from a mobile phone, a Personal Digital Assistant (PDA), a tablet, a desktop computer, or a laptop. In some embodiments, the group is an organization that is related to consumer goods, e.g., foods, drinks, clothes, etc. In some embodiments, the one or more client devices 116A-N are used in combination with the demand management platform 106 to specify a meta-data model of the group with which the client device 116 is associated.

In some embodiments, the external information sourcing module 110 associated with the dynamic demand management server 104 obtains data from the one or more external data sources 102A-N. The external data sources 102A-N may include a weather data source, macro-economic data source, an industry indices data source that includes indices such as Gross Domestic Product (GDP), an inflation metric or employment rate, etc., commodities data source, market trends data source, consumer sentiments data source and a demographic data source. In some embodiments, the demographic data source includes income data of residents, population, etc. The external information sourcing module 110 processes the data obtained from the external data sources 102A-N and stores in the external information database 112. In some embodiments, the external information database 112 includes information which remains horizontal for one or more demand management services. In some embodiment, the dynamic demand management server 104 may obtain weather information to compute the demand of the product from one or more weather sensors. The dynamic demand management server 104 integrates machine-learning model that impacts a factor group for generating a dynamic recommendation to collectively optimize a parameter. In some embodiments, the factor group includes a pricing and promotions factor group, a sales and distribution factor group or an inventory placement and allocation factor group. In some embodiments, the pricing and promotions factor group includes at least one of a location, a store, a product, a price-pack, a placement of product, a placement, a range, a visibility, a coverage, a frequency, a distribution reach, a channel, an event type or an inventive. In some embodiments, the sales and distribution factor group includes at least one of a channel, a location of a promotion activity, a product for promotion, a price-pack, a time period or a calendar for a promotion activity, a promotion type, a price for a promotion activity, a discount for a promotion activity, or a creative for a promotion activity.

In some embodiments, the inventory placement and allocation factor group includes at least one of a location of inventory, a store of inventory, a type of inventory, a source location of inventory, a transfer of inventory, a new quantity for the inventory, a safety stock of inventory for a product, on hand levels of inventory or a reorder quantity of inventory, or an allocation quantity of inventory.

The dynamic demand management server 104 processes a specification information of the demand management service and operational data corresponds to the group. In some embodiments, the specification information includes internal data of the group and a meta-data model that corresponds to the group. In some embodiments, the one or more client devices 116A-N specify the specification information of the group for which the demand management service is created. In some embodiments, the one or more client devices 116A-N specify the meta-data model and the operational data corresponds to the group. In some embodiments, the operational data corresponding to the factor group. In some embodiments, the operational data corresponds to the pricing and promotions factor group includes data that corresponds to a promotion, at least one sales activity, at least one distribution activity history and at least one plan. In some embodiments, the operational data corresponds to the sales and distribution factor group includes the data corresponding to a sale of a product, an order history and a sales plan. In some embodiments, the operational data corresponds to the inventory placement and allocation factor group includes the data corresponding to an inventory history and an inventory plan. In some embodiments, the one or more client devices 116A-N obtain data relating to an in-store execution activity about the group and communicates the data relating to the in-store execution activity to the dynamic demand management server 104.

In some embodiments, the dynamic demand management server 104 enables the one or more client devices 116A-N associated with the one or more clients 118A-N to select products of interest and model existing demand management services to determine an infrastructure of the dynamic demand management environment 108 which may be required or preferred. In some embodiments, the dynamic demand management server 104 may capture operational constraints of the group from the one or more client devices 116A-N associated with the one or more clients 118A-N. In some embodiments, the dynamic demand management server 104 may allow the one or more clients 118A-N to request an update in at least one of (i) the specification information of the group or (ii) the operational data. In some embodiments, the dynamic demand management server 104 includes a one or more machine learning models. The one or more machine learning models include an anticipation ML model that optimizes a demand parameter or a recommendation ML model that generates a recommendation for optimizing at least one factor group. The at least one factor group includes at least one of a first factor group, a second factor group or a third factor group. In some embodiments, the one or more machine learning models may include, but not limited to, advanced algorithms including but not limited to SVR, XGBoost, Random Forests, Prophet, DeepAR, LSTM/RNNs, Generative Adversarial Networks, Convolutional Neural Networks, Quantile Regressions, Bayesian Regressions, Factorization Machines, Bayesian Structural Time Series Models, Hidden Markov Models and Monte Carlo Markov Chains.

The dynamic demand management server 104 trains a one or more machine learning model with processed specification information and the operational data. The dynamic demand management server 104 computes a demand of a product of the group using the trained machine learning model. In some embodiments, the product of the group is at least one of consumer products or industrial products and services. In some embodiments, the consumer products include (i) convenience products, e.g., newspapers, matchbox, soaps, toothpastes etc. In some embodiments, the industrial products and services offer goods and services and include those used in a production of a final product, e.g., basic or raw materials and components, instruments, hardware or tools. In some embodiments, the product is a perishable product.

The dynamic demand management server 104 computes a demand of a product using the trained machine learning model by (i) identifying an emerging signal that represents an impact that corresponds to at least one factor that of at least one factor group, (ii) determining an elasticity of the at least one factor to the demand of the product and an effect of interaction between one or more factors associated with at least one factor group on the demand, and (iii) quantifying probabilistic values that signify prediction of the demand The probabilistic values include at least one elasticity associated with the at least one factor and a demand forecast adjustment of the product.

The dynamic demand management server 104 quantifies probabilistic values that signify prediction of the demand, a demand elasticity associated with the factor and a demand forecast adjustment of the product using the trained machine learning model.

The dynamic demand management server 104 updates the trained machine learning model associated with the factor group using quantified probabilistic values to generate the dynamic recommendation to the client device 116A to update values of the at least one factor of the at least one factor group. The dynamic recommendation is recommendation is associated with at least one factor group and collectively optimizes the parameter of the demand management service.

Figure 2:
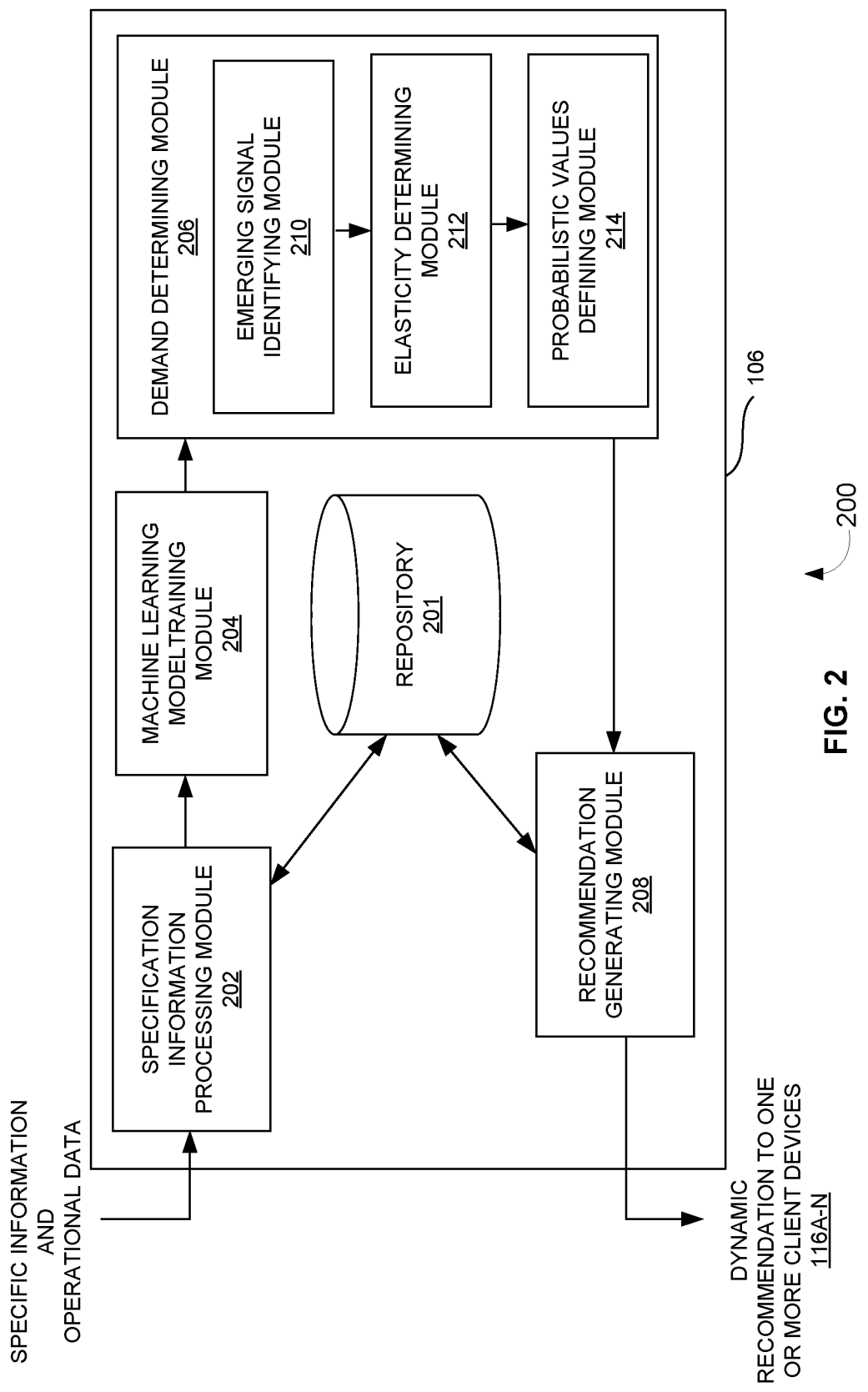
FIG. 2 is a block diagram of the demand management platform of a dynamic demand management server of FIG. 1 according to some embodiments herein.

FIG. 2 is a block diagram 200 of the demand management platform 106 of the dynamic demand management server 104 of FIG. 1 according to some embodiments herein. The demand management platform 106 includes a repository 201, a specification information processing module 202, a machine learning model training module 204, a demand determining module 206 and a recommendation generating module 208. The demand determining module 206 includes an emerging signal identifying module 210, an elasticity determining module 212 and a probabilistic value defining module 214.

The specification information processing module 202 captures and processes a specification information of a demand management service and operational data corresponds to a group. In some embodiments, the specification information includes internal data of the group and a meta-data model that corresponds to the group. In some embodiments, the specification information processing module 202 stores the internal data of the group and the meta-data model in the repository 201.

In some embodiments, the specification information processing module 202 receives operational data from the one or more client devices 116A-N and stores the operational data in the repository 201. In some embodiments, the operational data corresponding to the factor group. In some embodiments, the operational data corresponds to the pricing and promotions factor group includes data that corresponds to a promotion, at least one sales activity, at least one distribution activity history and at least one plan. In some embodiments, the operational data corresponds to the sales and distribution factor group includes the data corresponding to a sale of a product, an order history and a sales plan. In some embodiments, the operational data corresponds to the inventory placement and allocation factor group includes the data corresponding to an inventory history and an inventory plan.

The machine learning model training module 204 trains the one or more machine learning models with processed specification information and the operational data to obtain trained machine learning models. The one or more ML models include at least one of an anticipation ML model that optimizes a demand parameter or a recommendation ML model that generates a recommendation for optimizing a factor group. The factor group includes at least one of a first factor group, a second factor group or a third factor group. In some embodiments, the machine learning model training module 204 may assemble, validate and publish a new machine learning model for consumption of the demand management service by the one or more client devices 116A-N associated with the demand management service.

The machine learning model training module 204 integrates the trained ML models with the one or more ML models by setting an output of a first ML model as a feature of a second ML model. The demand determining module 206 determines a demand of a product of the demand management service using the one or more ML models by (i) identifying an emerging signal that represents an impact that corresponds to at least one factor that of the factor group using the emerging signal identifying module 210, (ii) determining an elasticity of the at least one factor to the demand of the product and an effect of interaction between one or more factors associated with the factor group on the demand using the elasticity determining module 212, and (iii) quantifying probabilistic values that signify prediction of the demand using the probabilistic values defining module 214. The probabilistic values include the elasticity associated with the at least one factor and a demand forecast adjustment of the product. The probabilistic values include at least one elasticity associated with the at least one factor and a demand forecast adjustment of the product. In some embodiments, the emerging signal identifying module 210 identifies the emerging signal represents the impact corresponds to the factor using deep learning and machine learning algorithms.

The recommendation generating module 208 updates in real-time the recommendation ML models that generate the recommendation for optimizing the factor group using the quantified probabilistic values. The recommendation generating module 208 generates the dynamic recommendation to the client devices 116A-N to update values of the at least one factor of the factor group. The dynamic recommendation is recommendation is associated with the factor group and collectively optimizes the parameter of the demand management service.

Figure 3:
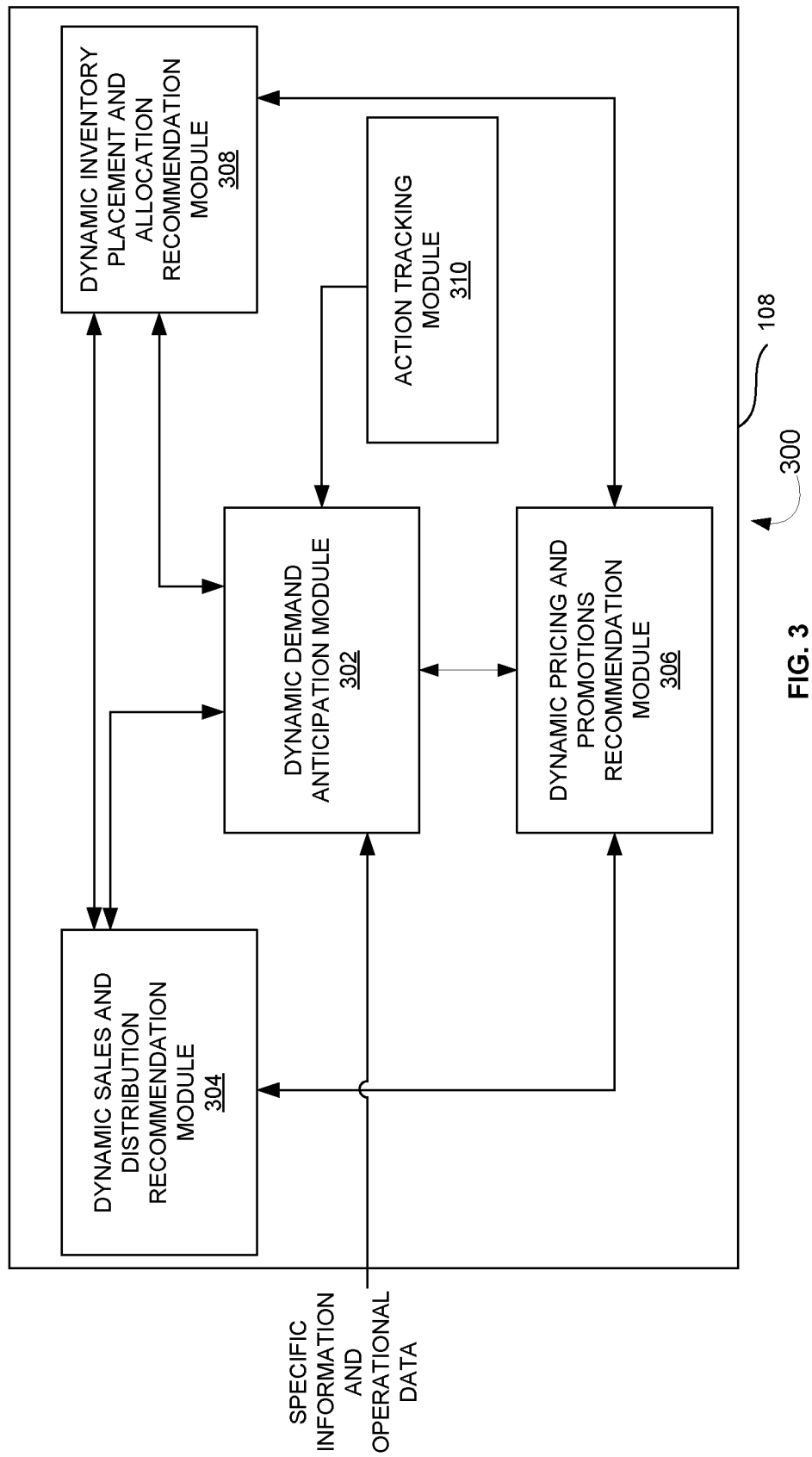
FIG. 3 is a block diagram of the dynamic demand management environment of the dynamic demand management server of FIG. 1 according to some embodiments herein.

FIG. 3 is a block diagram 300 of the dynamic demand management environment 108 of the dynamic demand management server 104 of FIG. 1 according to some embodiments herein. The block diagram 300 includes a dynamic demand anticipation module 302, a dynamic sales and distribution recommendation module 304, a dynamic pricing and promotions recommendation module 306 and a dynamic inventory placement and allocation module recommendation 308 and an action tracking module 310. In some embodiments, the dynamic demand anticipation module 302, the dynamic sales and distribution recommendation module 304, the dynamic pricing and promotions recommendation module 306 and the dynamic inventory placement and allocation recommendation module 308 are interconnected with each other and work on common interconnecting factors and common data available in the repository 201. In some embodiments, the dynamic demand anticipation module 302, the dynamic sales and distribution recommendation module 304, the dynamic pricing and promotions recommendation module 306 and the dynamic inventory placement and allocation recommendation module 308 generate recommendations that impact a factor group associated with them.

The dynamic demand anticipation module 302 receives a specification information and operational data of the demand management service from the repository 201 of the demand management platform 106. The dynamic demand anticipation module 302 utilizes one or more machine learning models which may include a first machine learning model based on dynamic demand forecasting and sensing, a second machine learning model for predictive new product forecasting, a third machine learning model for demand driver attribution and a fourth machine learning model for demand risk and opportunity quantification. Based on the one or more machine learning models of the dynamic demand anticipation module 302, the dynamic demand anticipation module 302 computes a demand of one or more products. In some embodiments, the dynamic demand anticipation module 302 predicts the demand of the one or more products. The dynamic demand anticipation module 302 may quantify probabilistic values associated with the demand The probabilistic values signify a prediction of the demand, a demand elasticity associated with one or more factors and a demand forecast adjustment. In some embodiments, the dynamic demand anticipation module 302 may compute demand deviation predictions using a deviation management service.

The dynamic demand anticipation module 302 communicates the quantified probabilistic values to the dynamic sales and distribution recommendation module 304, the dynamic pricing and promotions recommendation module 306 and the dynamic inventory placement and allocation recommendation module 308. The dynamic demand anticipation module 302 utilizes deep learning and machine learning algorithms to identify an emerging signal which may be indicative of an impact with respect to a factor. In some embodiments, the factor is at least one of an internal factor or an external factor. In some embodiments, the internal factors are associated with the pricing and promotions factor group, the sales and distribution factor group or the inventory placement factor group. The pricing and promotions factor group may include factors such as a promotion type, a duration channel, a promotion price.

The sales and distribution factor group may include factors such as incentive actions, events, price-pack, brand attribute, stock keeping unit attribute, weather, channel coverage, sale activities or geographical attributes. The inventory placement and allocation factor group may include factors such as a lead time, an order frequency, a reorder point, a delivery mode, a demand consumption, a network path, a channel contract, a demand volatility or a production schedule. In some embodiments, the external factors include weather factors, macro-economic factors, demographic factors, consumer trend factor or a media factor. In some embodiments, data which relates to the external factors may be stored in the external information database 112 and the data related to the internal factors may be stored in the repository 201.

In some embodiments, the dynamic demand anticipation module 302 quantifies an elasticity of the one or more factors groups and contributions of the one or more factors of the factor groups and the external factors with respect to the demand of the one or more products. In some embodiments, the dynamic demand anticipation module 302 quantifies an interaction between the one or more factor groups and the external factors. In some embodiments, the dynamic demand anticipation module 302 quantifies a deviation of demand compared to a previous prediction by utilizing a deviation management service associated with the group. In some embodiments, the dynamic demand anticipation module 302 communicates the quantified elasticity of the one or more factor groups and quantified probabilistic values to the dynamic sales and distribution recommendation module 304, the dynamic pricing and promotions recommendation module 306 and the dynamic inventory placement and allocation recommendation module 308.

In some embodiments, the dynamic demand anticipation module 302 constantly updates the one or more machine learning models based on the latest available data from internal data available in the repository 201 and data available in the external information database 112. The dynamic demand anticipation module 302 is updated with one or more frequencies such as daily, weekly, etc. which results in the update of quantified probabilistic values. In some embodiments, the dynamic sales and distribution recommendation module 304, the dynamic pricing and promotions recommendation module 306 and the dynamic inventory placement and allocation recommendation module 308 are updated with the one or more frequencies. The dynamic sales and distribution recommendation module 304, the dynamic pricing and promotions recommendation module 306 and the dynamic inventory placement and allocation recommendation module 308 are also constantly training one or more machine learning models associated with them based on updates of the dynamic demand anticipation module 302.

The dynamic sales and distribution recommendation module 304 receive the quantified probabilistic values from the dynamic demand anticipation module 302. In some embodiments, the dynamic sales and distribution recommendation module 304 utilizes the one or more machine learning models which may include (i) the first machine learning model for forecasting of trends and anomalies with respect to a plan of sale of a point of sale device, (ii) the second machine learning model for early warnings of sales deviation, (iii) the third machine learning model of sales driver attribution which determines one or more factors of the one or more factor groups that may be attributed for driving sales of a one or more product and (iv) the fourth machine learning model for a prediction of volume share. In some embodiments, the dynamic sales and distribution recommendation module 304 may generate a recommendation for the sales and distribution department based on the received quantified elasticities and the demand deviation to maximize revenue. The recommendation generated by the dynamic sales and distribution recommendation module 304 may include the recommendation to update values across one or more factors of the factor group associated with the sales and distribution group. The recommendation generated by the dynamic sales and distribution recommendation module 304 may be a combination of the one or more factors of the factor group associated with the sales and distribution department which include factors such as a location, a store, a product, a price-pack, a placement of product, a placement, a range, a visibility, a coverage, a frequency, a distribution reach, a channel, an event type or an inventive such as market development fee, slotting fee, etc. In some embodiments, the recommendation generated by the dynamic sales and distribution recommendation module 304 may include price-pack additions or changes, an identification of a deviation for a point of sale or retailer, a recommendation for adjustment to sales activities or a recommendation for channel incentive allocation or reallocation.

In some embodiments, the second machine learning model of the dynamic sales and distribution recommendation module 304 may be derived from a deviation management service. In some embodiments, the dynamic pricing and promotions recommendation module 306 may generate a recommendation for the pricing and promotions department of the group based on the received quantified elasticities and the demand deviation to maximize the parameter of the group. In some embodiments, the one or more machine learning models of the dynamic sales and distribution recommendation module 304 may be interconnected with each other in such a manner that an output of the first machine learning model becomes a feature for the second machine learning model.

The dynamic pricing and promotions recommendation module 306 receive the quantified probabilistic values from the dynamic demand anticipation module 302. In some embodiments, the dynamic pricing and promotions recommendation module 306 utilizes the one or more machine learning models which may include (i) the first machine learning model for promotional lift effectiveness and return of investment, (ii) the second machine learning model for promotion deviation and opportunity detection and (iii) the third machine learning model for optimization of promotion. The recommendation generated by the dynamic pricing and promotions recommendation module 306 may include the recommendation to update values across the one or more factors of the pricing and promotions factor group. The recommendation generated by the dynamic pricing and promotions recommendation module 306 may be the combination of the one or more factors of the pricing and promotions factor group include factors such as a channel, a location of a promotion activity, a product for promotion, a price-pack, a time period (calendar) for a promotion activity, a promotion type, a price for a promotion activity, a discount for a promotion activity or a creative for a promotion activity. In some embodiments, the recommendation generated by the dynamic pricing and promotions recommendation module 306 may include the recommendation for promotion budget re-allocations, a recommendation for promotion event adjustments or a recommendation for promotion forecasts and lift prediction for a plan of promotion.

In some embodiments, the second machine learning model for promotion deviation and opportunity detection of the dynamic pricing and promotions recommendation module 306 may be derived from the deviation management service. In some embodiments, the dynamic pricing and promotions recommendation module 306 may generate the recommendation for the pricing and promotions department of the group based on the received quantified elasticities and the demand deviation to maximize the parameter of the group. In some embodiments, the one or more machine learning models of the dynamic pricing and promotions recommendation module 306 may be interconnected with each other in such a manner that the output of the first machine learning model becomes the feature for the second machine learning model.

The dynamic inventory placement and allocation recommendation module 308 receives the quantified probabilistic values from the dynamic demand anticipation module 302. In some embodiments, the dynamic inventory placement and allocation recommendation module 308 utilizes the one or more machine learning models which may include (i) the first machine learning model for on hand inventory forecasts, (ii) the second machine learning model for out of stock or excess stock prediction, (iii) the third machine learning model for inventory driver attribution and (iv) the fourth machine learning model for quantification of inventory deviation. The recommendation generated by the dynamic inventory placement and allocation recommendation module 308 may include a recommendation to update values across the one or more factors of inventory placement and allocation factor group. The recommendation generated by the dynamic inventory placement and allocation recommendation module 308 may be a combination of the one or more factors of the factor group associated with the pricing and promotions department which includes factors such as a location of inventory, a store of inventory, a type of inventory, a source location of inventory, a transfer of inventory, a new quantity for the inventory, a safety stock of inventory for a product, on hand levels of inventory or a reorder quantity of inventory, an allocation quantity of inventory. In some embodiments, the recommendation generated by the dynamic inventory placement and allocation recommendation module 308 may include a recommendation for inventory re-placement, a recommendation for adjustment of inventory allocation adjustment and a recommendation for order quantity and timing adjustments.

In some embodiments, the fourth machine learning model of the inventory placement and allocation recommendation module 308 may be derived from the deviation management service. In some embodiment, the dynamic inventory placement and allocation recommendation module 308 may generate the recommendation for the inventory department of the group. In some embodiments, the one or more machine learning models of the inventory placement and allocation recommendation module 308 may be interconnected with each other in such a manner that the output of the first machine learning model becomes a feature for the second machine learning model.

In some embodiments, the one or more machine models are trained using large volume of data that is available in the external information database 112 and the repository 201. The data utilized from the external information database 112 may include weather data, e.g. temperature, humidity, etc. competition data, industry data, one or more consumer indices or macro-economic indices such as gross domestic product, an inflation metric or employment rate, etc. In some embodiments, the external information database 112 may include demographics data which includes income, population, etc.

In some embodiments, a predicted deviation factor attribution module of the deviation management service associated with the group utilises the data available in the external information database 112 and the repository 201 to determine the one or more factors which attribute to a predicted demand The action tracking module 310 tracks one or more actions taken by the group. The action tracking module 310 enables a feedback loop for reinforcement learning by taking into account the actions taken in the group to allow the dynamic demand management system 104 to make accurate predictions on the demand of the one or more products.

Figure 4:
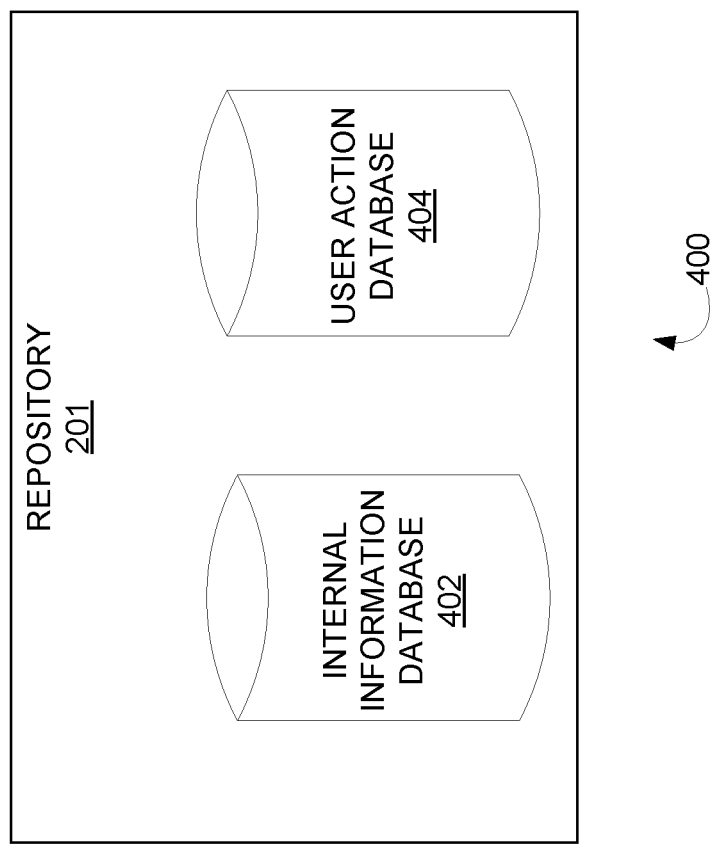
FIG. 4 is a block diagram of a repository of the demand management platform 106 FIG. 2 according to some embodiments herein.

FIG. 4 is a block diagram 400 of the repository 201 of the demand management platform 106 of FIG. 2 according to some embodiments herein. The block diagram 400 of the repository 201 includes an internal information database 402 and a user action database 404. The internal information database 402 includes data which is internal related to internal factors of a group. The user action database 404 stores actions which are taken by the one or more clients 116A-N in the group. In some embodiments, the actions taken by the one or more clients 116A-N in the group may either be based on recommendations provided by the dynamic sales and distribution recommendation module 304, the dynamic pricing and promotions recommendation module 306 or the dynamic inventory placement and allocation module to the group and also be independent from the same.

In some embodiments, the internal information database 402 may include operational data. The operational data of the group may include sales operations.

In some embodiments, the internal information database 402 includes planning data of the group. The planning data of the group may include sales plans and forecasts, financial plans and forecasts, price plans, marketing plans, promotion plans, demand plans, inventory plans, production plans.

Figure 5:
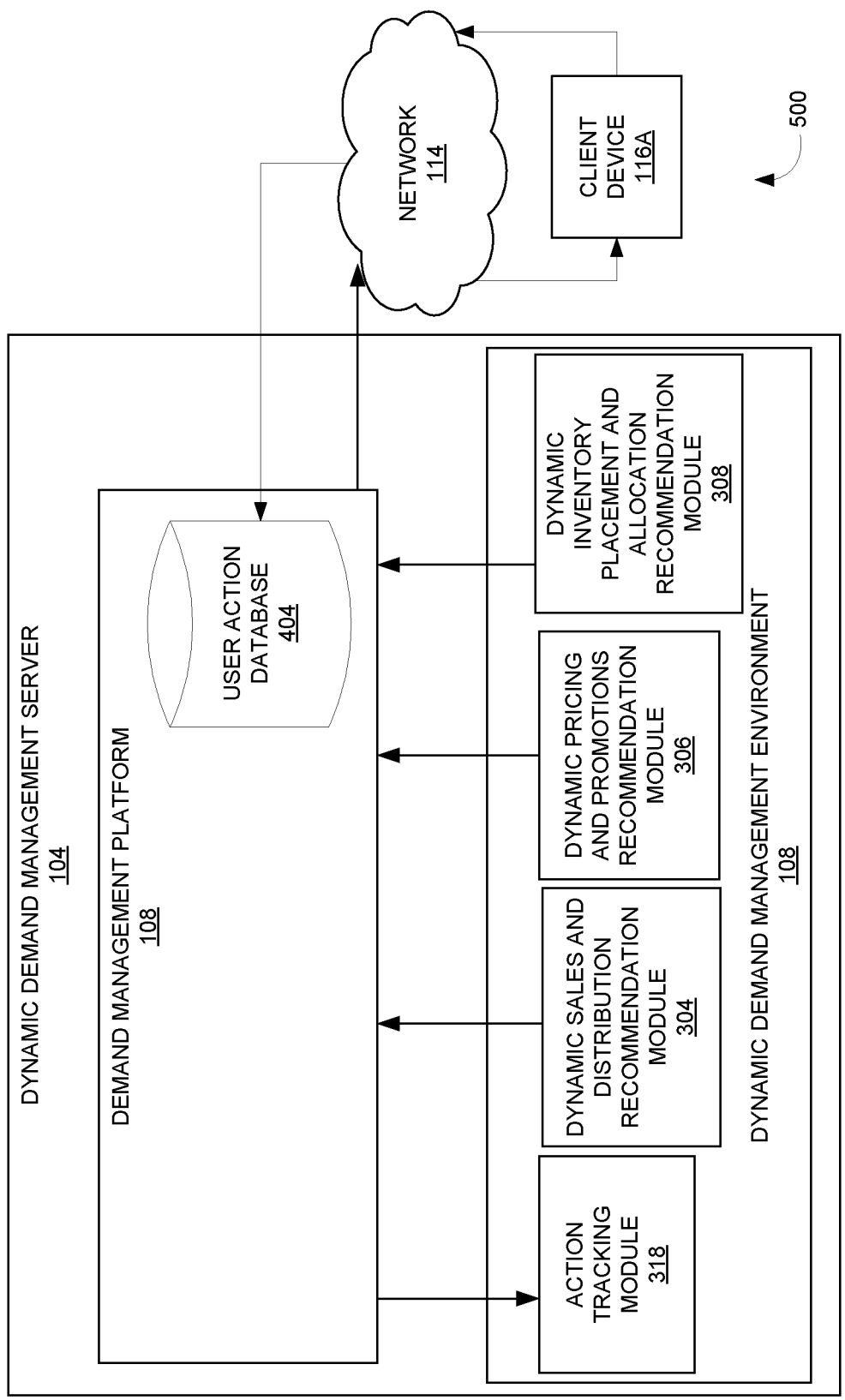
FIG. 5 is block diagram of a feedback loop which enables reinforcement learning to make accurate predictions on demands of one or more products according to some embodiments herein.

FIG. 5 is block diagram 500 of a feedback loop which enables reinforcement learning to make accurate predictions on demands of one or more products according to some embodiments herein. The action tracking module 310 tracks an action taken by the one or more clients in the group. In some embodiments, the action may be captured from the one or more client devices 116A-N through the network 114. The user action database 404 stores an action taken by the one or more clients in the group. In some embodiments, recorded action taken in the group which is stored in the user action database 404 is transmitted to the action tracking module 310 for enabling reinforcement learning of the machine learning models in the dynamic demand management environment 108. The action tracking module 310 may employ advanced machine learning models for providing accurate predictions on the demand of the product.

In some embodiments, the dynamic sales and distribution recommendation module 304, the dynamic pricing and promotions recommendation module 306 and the inventory placement and allocation recommendation module 308 generate recommendations and communicate the recommendations to the client device 116A through the network 114. The dynamic demand management server 104 communicates the accurate predictions and improved action recommendations to the one or more client devices 116A-N through the network 114.

Figure 6A:
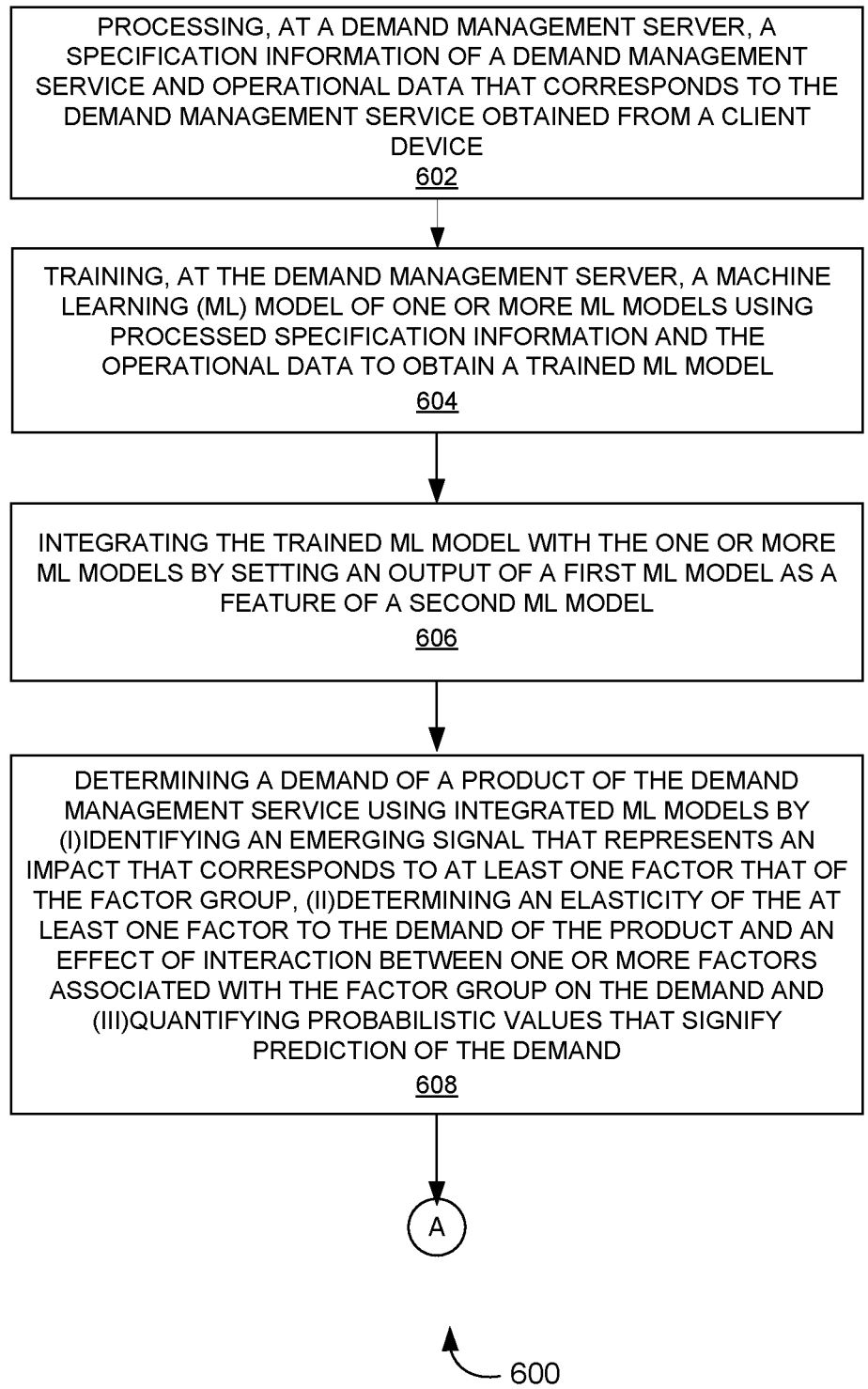
FIGS. 6A-B are flow diagrams that illustrate a method for integrating a machine-learning model that impacts a factor group for generating a dynamic recommendation to collectively optimize a parameter according to some embodiments herein.
Figure 6B:
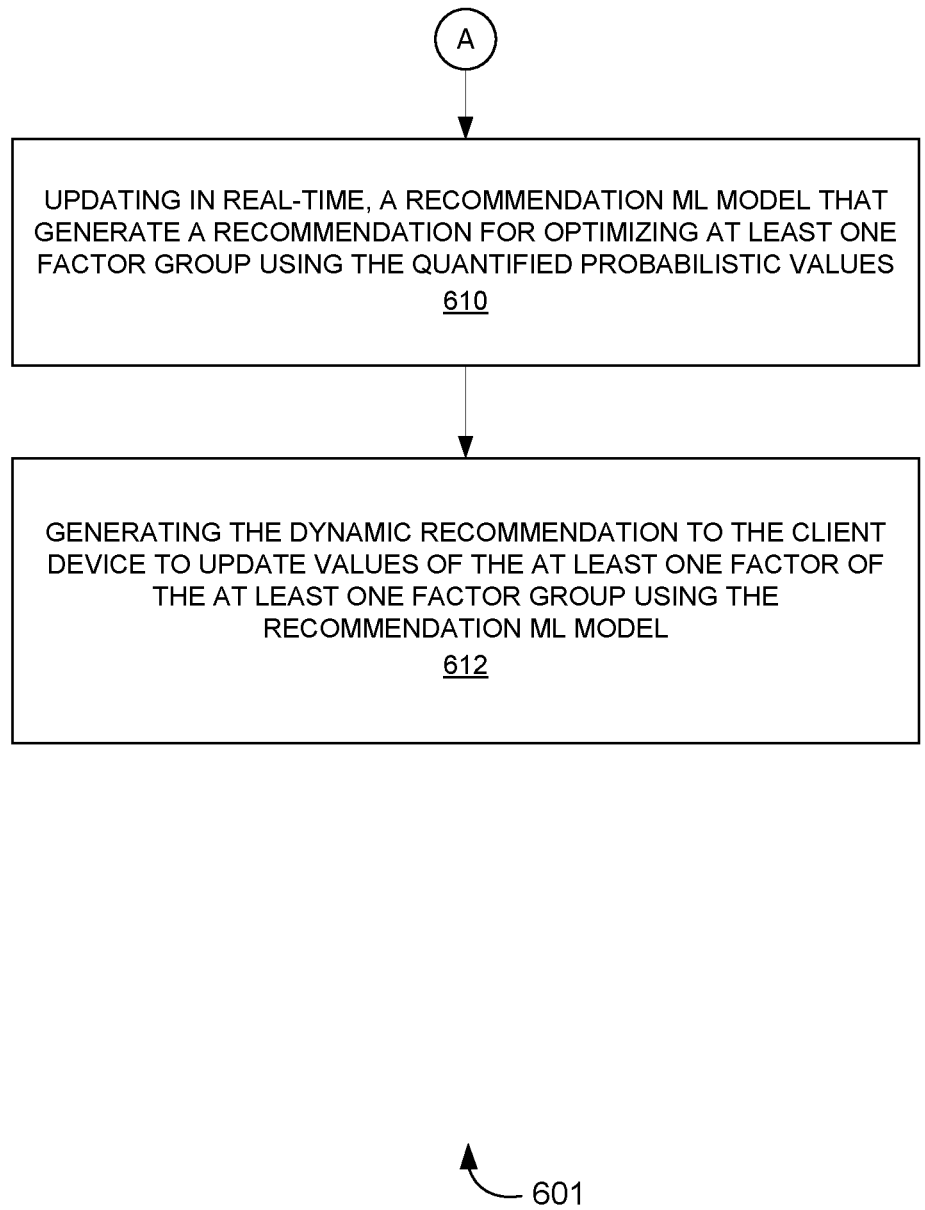

FIGS. 6A-6B are flow diagrams that illustrate a method 600 for integrating a machine-learning model that impacts a factor group for generating a dynamic recommendation to collectively optimize a parameter according to some embodiments herein. At step 602, the method 600 includes processing, at the demand management server 104, a specification information of a demand management service and operational data that corresponds to the demand management service obtained from the client device 116A. At step 604, the method 600 includes training, at the demand management server 104, a machine learning (ML) model of the one or more ML models using processed specification information and the operational data to obtain a trained ML model. The one or more ML models include an anticipation ML model that optimizes a demand parameter or a recommendation ML model that generates a recommendation for optimizing at least one factor group. The at least one factor group includes a first factor group, a second factor group or a third factor group that generates a recommendation for optimizing at least one factor group. The at least one factor group includes at least one of a first factor group, a second factor group or a third factor group. At step 606, the method 600 includes integrating the trained ML model with the one or more ML models by setting an output of a first ML model as a feature of a second ML model. At step 608, the method 600 includes determining a demand of a product of the demand management service using the one or more ML models by (a) identifying an emerging signal that represents an impact that corresponds to at least one factor that of at least one factor group, (b) determining an elasticity of the at least one factor to the demand of the product and an effect of interaction between one or more factors associated with at least one factor group on the demand, and (c) quantifying probabilistic values that signify prediction of the demand. The probabilistic values include at least one elasticity associated with the at least one factor and a demand forecast adjustment of the product.

In FIG. 6B of the method 601, At step 610, the method 601 includes updating in real-time, the recommendation ML model generates a recommendation for optimizing at least one factor group using the quantified probabilistic values. At step 612, the method 601 includes generating the dynamic recommendation to the client device 116A to update values of the at least one factor of the at least one factor group using the recommendation ML model. The dynamic recommendation is recommendation is associated with at least one factor group and collectively optimizes the parameter of the demand management service.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
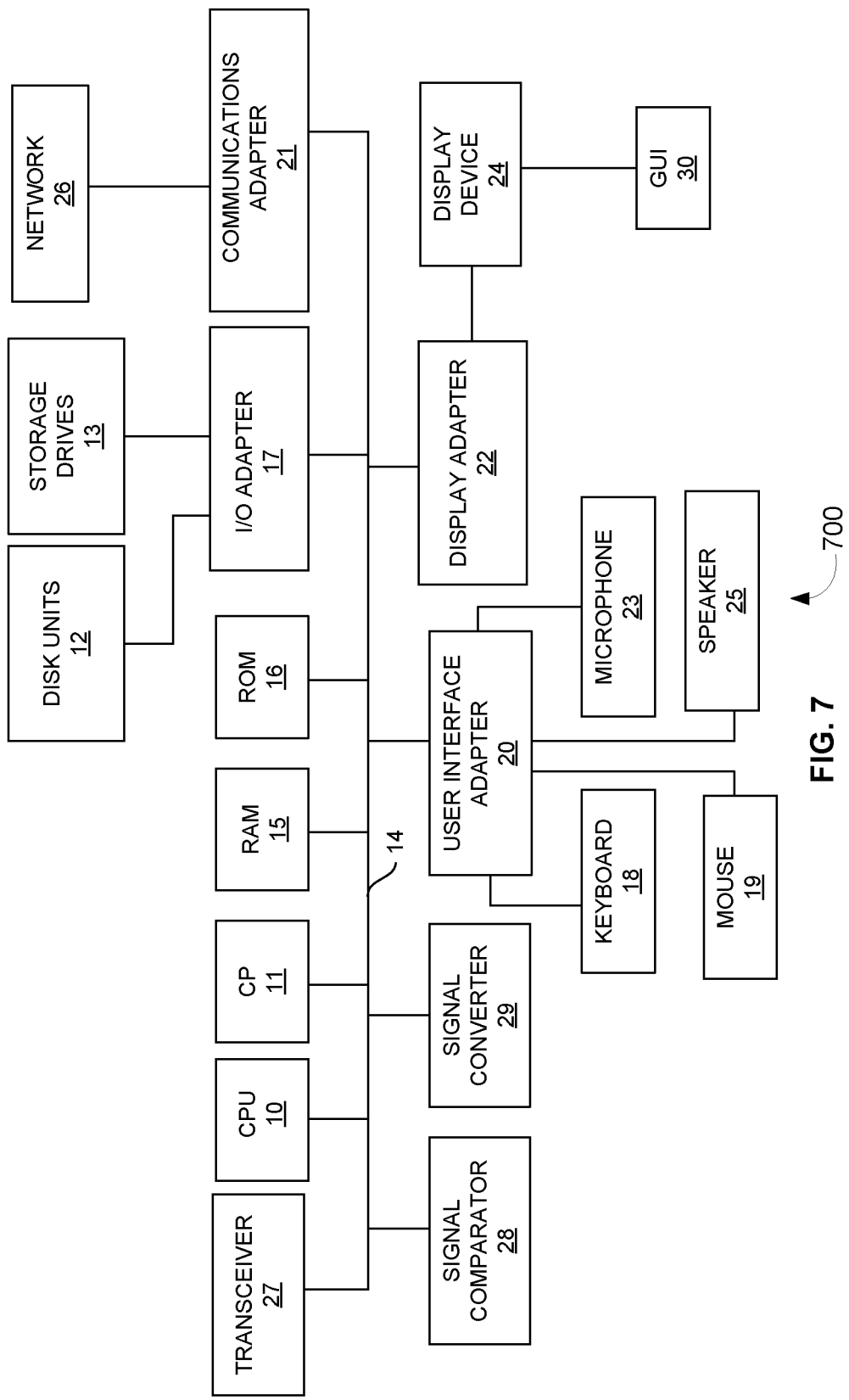
FIG. 7 is a block diagram of a device used in accordance with embodiments herein.

A representative hardware environment for practicing the embodiments herein is depicted in FIG. 7, with reference to FIGS. 1 through 6. This schematic drawing illustrates a hardware configuration of a server/computer system/ user device in accordance with the embodiments herein. The user device includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device can read the inventive instructions on the program storage devices and follow these instructions to execute the methodology of the embodiments herein. The user device further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

I claim:

1. A method for integrating a plurality of machine-learning models that impact different factor groups for generating a dynamic recommendation to collectively optimize a parameter, the method comprising:

processing, at a demand management server, a specification information of a demand management service, wherein the specification information comprises internal data of the impacted different factor groups and a meta-data model that corresponds to the impacted different factor groups, and operational data that corresponds to the demand management service obtained from at least one client device, wherein the at least one client device specifies the specification information of the group for which the demand management service is created;

training, at the demand management server, a machine learning (ML) model of the plurality of ML models using processed specification information and the operational data to obtain a trained ML model, wherein the plurality of ML models comprise at least one of an anticipation ML model that optimizes a demand parameter or a recommendation ML model that generates a recommendation to the impacted different factor groups for optimizing the parameter, wherein the impacted different factor groups comprise a first factor group, a second factor group and er a third factor group, wherein the first factor group comprises a pricing and promotions factor group, the second factor group comprises a sales and distribution factor group, and the third factor group comprises an inventory placement and allocation factor group;

integrating the trained ML model with the plurality of ML models by setting an output of a first ML model as a feature of a second ML model;

determining a demand of a product of the demand management service using integrated ML models by:

identifying an emerging signal that represents an impact that corresponds to at least one factor;

determining an elasticity of the at least one factor to the demand of the product and an effect of interaction between a plurality of factors associated with the factor group on the demand; and quantifying probabilistic values that signify prediction of the demand, wherein the probabilistic values comprise the elasticity associated with the at least one factor and a demand forecast adjustment of the product;

updating in real-time, the recommendation ML model generates the recommendation for optimizing the parameter using quantified probabilistic values; and generating the dynamic recommendation to the at least one client device to update values of the at least one factor of the impacted different factor groups using the recommendation ML model, wherein the dynamic recommendation is the recommendation associated with the impacted different factor groups and collectively optimizes the parameter of the demand management service, wherein the operational data corresponds to the pricing and promotions factor group and comprises data that corresponds to a promotion, at least one sales activity, at least one distribution activity history and at least one plan, wherein the operational data corresponds to the sales and distribution factor group and the operational data comprises the data corresponding to a sale of a product, an order history and a sales plan, wherein the operational data corresponds to the inventory placement and allocation factor group and comprises the data corresponding to an inventory history and an inventory plan.

2. The method as claimed in claim 1, wherein the demand management server identifies the emerging signal represents the impact corresponds to the at least one factor using deep learning and ML algorithms.

3. The method as claimed in claim 1, wherein the computing the demand of the at least one product using at least one of the anticipation model to determine (i) dynamic demand forecasting and sensing, (ii) predictive a new product forecasting, (iii) demand driver attribution or (iv) demand risk and opportunity quantification.

4. The method as claimed in claim 1, wherein the pricing and promotions factor group comprises at least one of a channel, a location of a promotion activity, a product for promotion, a price-pack, a time period or a calendar for a promotion activity, a promotion type, a price for a promotion activity, a discount for a promotion activity, or a creative for a promotion activity.

5. The method as claimed in claim 4, wherein the recommendation to update the values of the pricing and promotions factor group is generated using the at least one the recommendation ML model for (i) forecasting of trends and anomalies with respect to a plan of sale of a point of a sale device, (ii) a warning of sales deviation, (iii) determining the at least one factor of the one or more factor group attributed for driving sales of the at least one product using sales driver attribution, or (iv) a prediction of volume share.

6. The method as claimed in claim 1, wherein the sales and distribution factor group comprises at least one of a location factor, a store factor, a product factor, a price-pack factor, a placement of product factor, a placement factor, a range factor, a visibility factor, a coverage factor, a frequency factor, a distribution reach factor, a channel factor, an event type factor or an incentive factor.

7. The method as claimed in claim 6, wherein the recommendation to update the values of the sales and distribution factor group is generated using the ML model for (i) promotional lift effectiveness and return of investment, (ii) promotion deviation and opportunity detection, or (iii) optimization of promotion.

8. The method as claimed in claim 1, wherein the inventory placement and allocation factor group comprises at least one of a location of inventory, a store of inventory, a type of inventory, a source location of inventory, a transfer of inventory, a new quantity for the inventory, a safety stock of inventory for a product, on hand levels of inventory or a reorder quantity of inventory, or an allocation quantity of inventory.

9. The method as claimed in claim 8, wherein the recommendation to update the values of the inventory placement and allocation factor group is generated using the machine learning model for on hand inventory forecasts, (ii) out of stock or excess stock prediction, (iii) inventory driver attribution and (iv) quantification of inventory deviation.

10. The method as claimed in claim 1, wherein the ML model is trained with planning data of the at least one group, wherein the planning data comprises sales plans and forecasts, financial plans and forecasts, price plans, marketing plans, promotion plans, demand plans, inventory plans and production plans.

11. The method as claimed in claim 1, wherein the method further comprises tracking at least one action taken by a plurality of clients at the plurality of client devices for enabling reinforcement learning of the ML models to provide accurate predictions on the demand of the at least one product.

12. A system integrating a plurality of machine-learning models that impact different factor groups for generating a dynamic recommendation to collectively optimize a parameter, the system comprising:
   a demand management server that comprises:
   a memory that stores a set of instructions; and
   a processor that executes the set of instructions and is configured to:
   process a specification information of a demand management service, wherein the specification information comprises internal data of the impacted different factor groups and a meta-data model that corresponds to the impacted different factor groups, and operational data that corresponds to the demand management service obtained from at least one client device, wherein the at least one client device specifies the specification information of the group for which the demand management service is created;
   train a machine learning (ML) model of the plurality of ML models using processed specification information and the operational data to obtain a trained ML model, wherein the plurality of ML models comprise at least one of an anticipation ML model that optimizes a demand parameter or a recommendation ML model that generates a recommendation to the impacted different factor groups for
   the parameter, wherein the impacted different factor groups comprise a first factor group, a second factor group and or a third factor group, wherein the first factor group comprises a pricing and promotions factor group, the second factor group comprises a sales and distribution factor group, and the third factor group comprises an inventory placement and allocation factor group;
   integrate the trained ML model with the plurality of ML models by setting 18 an output of a first ML model as a feature of a second ML model;
   determine a demand of a product of the demand management service using integrated ML models by:
   identifying an emerging signal that represents an impact that corresponds to at least one factor;
   determining an elasticity of the at least one factor to the demand of the product and an effect of interaction between a plurality of factors associated with the factor group on the demand; and
   quantifying probabilistic values that signify prediction of the demand, wherein the probabilistic values comprise the elasticity associated with the at least one factor and a demand forecast adjustment of the product;
   update in real-time the recommendation ML model generates the recommendation for optimizing the parameter using quantified probabilistic values; and
   generate the dynamic recommendation to the at least one client device to update values of the at least one factor of the impacted different factor groups using the recommendation ML model, wherein the dynamic recommendation is the recommendation associated with the impacted different factor groups and collectively optimizes the parameter of the demand management service, wherein the operational data corresponds to the pricing and promotions factor group and comprises data that corresponds to a promotion, at least one sales activity, at least one distribution activity history and at least one plan, wherein the operational data corresponds to the sales and distribution factor group and the operational data comprises the data corresponding to a sale of a product, an order history and a sales plan, wherein the operational data corresponds to the inventory placement and allocation factor group and comprises the data corresponding to an inventory history and an inventory plan.

* * * * *